United States Patent [19]

Kobayashi et al.

[11] Patent Number: 5,206,330
[45] Date of Patent: Apr. 27, 1993

[54] METHOD FOR THE PREPARATION OF ORGANOPOLYSILOXANE FREE FROM ACID CATALYST RESIDUE

[75] Inventors: Kouichirou Kobayashi; Naoyuki Ida, both of Gunma; Shigeru Mori, Kanagawa, all of Japan

[73] Assignee: Shin-Etsu Chemical Co., Ltd., Tokyo, Japan

[21] Appl. No.: 645,918

[22] Filed: Jan. 25, 1991

[30] Foreign Application Priority Data

Jan. 26, 1990 [JP] Japan ................................ 2-17079

[51] Int. Cl.⁵ .............................................. C08G 77/06
[52] U.S. Cl. .................................... 528/23; 528/25; 556/462; 556/467
[58] Field of Search .............. 556/462, 467; 528/23, 528/25

[56] References Cited

U.S. PATENT DOCUMENTS 2,469,883  5/1949  Marsden et al. ................... 528/23
2,491,843 12/1949  Wilcock ............................. 528/23
4,855,381  8/1989  Mutoh et al. ...................... 556/462

*Primary Examiner*—Melvyn I. Marquis
*Attorney, Agent, or Firm*—Millen, White, Zelano & Branigan

[57] ABSTRACT

Proposal is given of a method for the preparation of an organopolysiloxane highly freed from any trace amount of the residue of sulfuric acid or fuming sulfuric acid by the siloxane rearrangement reaction of organosiloxane oligomers into equilibirium by using the acid catalyst. The inventive method comprises subjecting the reaction mixture, after completion of the reaction but before the conventional step of washing with a large volume of water to remove the acid residue, to a hydrolysis reaction of the acid residue bonded to the organopolysiloxane molecules with admixture of a limited amount of water and separating the mixture into aqueous and organopolysiloxane phases to discard the acid-containing aqueous phase.

2 Claims, No Drawings

METHOD FOR THE PREPARATION OF ORGANOPOLYSILOXANE FREE FROM ACID CATALYST RESIDUE

BACKGROUND OF THE INVENTION

The present invention relates to a method for the preparation of an organopolysiloxane or, more particularly, to a method for the preparation of an organopolysiloxane, such as a silicone fluid, free from any trace amount of the acid catalyst residue and still containing a greatly reduced amount of the silanolic hydroxy groups in a process of the siloxane rearrangement reaction of organosiloxane oligomers to effect polymerization and equilibration by using an acidic catalyst such as sulfuric acid and fuming sulfuric acid.

It is a well established process in the art of organopolysiloxanes or so-called silicone products, such as silicone fluids and the like, that the organopolysiloxane is prepared by subjecting organosiloxane oligomers to the siloxane rearrangement reaction to effect polymerization and equilibration by using sulfuric acid or fuming sulfuric acid as the catalyst. It is also known in this process that fragments of the acid catalyst are contained in the product organopolysiloxane as combined to the molecular chain ends of the organopolysiloxane. An organopolysiloxane product containing such an acid catalyst residue is disadvantageous in respect of the unpleasant odor and corrosiveness when it is used as an ingredient in a cosmetic or toiletry preparation or as a material in various electronic and electric devices and instruments. Therefore, the acid catalyst residue contained in an organopolysiloxane should desirably be removed therefrom as completely as possible.

Accordingly, it is conventionally undertaken to wash the organopolysiloxane as polymerized thoroughly with a large volume of water so that the acid catalyst residue can be removed to a considerable extent because the acid residue combined to the molecules of the organopolysiloxane is susceptible to hydrolysis. This conventional method, however, never provides a complete solution of the problem since, even by setting aside the problems due to the troublesomeness of the procedure and disposal of the so large volume of acidified washing, removal of the acid catalyst residue cannot be complete enough always leaving a small but non-negligible amount of the acid residue as contained in the organopolysiloxane. Moreover, thorough washing of the organopolysiloxane with a large volume of water to remove the acid catalyst residue unavoidably introduces silanolic hydroxy groups into the organopolysiloxane in a correspondingly large amount. When such a silanol-containing organopolysiloxane is employed, the silanol groups obtained from the dehydration condensation during use to produce water as the condensation product is acidified by the trace amount of the acid residue therein and causes serious problems of corrosion of metallic surfaces or breakdown of electric insulation. Thus, it is eagerly desired to develop a convenient and reliable method for the removal of the acid catalyst residue from an organopolysiloxane prepared by the acid-catalyzed reaction to an as high as possible extent of completeness without increasing the content of the silanol groups or rather by decreasing the content thereof.

SUMMARY OF THE INVENTION

The present invention accordingly has an object to provide a simple but very reliable method for the preparation of an organopolysiloxane which is highly free from any trace amount of the acid catalyst residue by the siloxane rearrangement reaction of organosiloxane oligomers to effect polymerization and equilibration in the presence of an acid catalyst such as sulfuric acid and fuming sulfuric acid still not increasing the amount of the silanolic hydroxy groups bonded to the silicon atoms.

Thus, the method of the present invention for the preparation of an organopolysiloxane highly free from the residue of acid catalyst comprises the successive steps of:

(a) subjecting a mixture of organosiloxane oligomers to a siloxane rearrangement reaction in the presence of sulfuric acid or fuming sulfuric acid as a catalyst to effect polymerization of the organosiloxanes to equilibrium to give an organopolysiloxane containing a residue of the acid;

(b) admixing and agitating the acid residue-containing organopolysiloxane with water in an amount in the range from 10% to 1000% by weight based on the amount of the acid catalyst used in step (a) to effect hydrolysis of the acid residue bonded to the organopolysiloxane molecules;

(c) subjecting the water-admixed organopolysiloxane to phase separation into an aqueous phase and a phase of organopolysiloxane to discard the aqueous phase; and (d) washing the organopolysiloxane freed from the aqueous phase with water.

DETAILED DESCRIPTION OF THE PREFERRED EMBODIMENTS

As is mentioned above, the product obtained by the inventive method is an organopolysiloxane which typically has a linear molecular structure represented by the general formula

in which each R either $R_3$ or $R_2$ is, independently from the others, an unsubstituted or substituted monovalent hydrocarbon group or a hydrogen atom and the subscript n is a positive integer sufficiently large or, for example larger than 10, to impart the organopolysiloxane with a desired viscosity, although the organopolysiloxane may have a small amount of branches in the molecule.

The staring material used in the inventive method is a mixture of organosiloxane oligomers or oligomeric organopolysiloxanes which may have a cyclic molecular structure, as in octamethyl cyclotetrasiloxane and the like, or a linear molecular structure, as in hexamethyl disiloxane, octamethyl trisiloxane and the like. The term of "oligomer" here implied means that the average degree of polymerization of the organopolysiloxane is not large or, for example not exceeding 10, though not particularly limitative thereto. It is optional according to need that the mixture of these oligomeric organopolysiloxanes contains organopolysiloxanes containing trifunctional or tetrafunctional siloxane units in such a limited amount that no gelation is caused by the siloxane rearrangement reaction to equilibrium. These organosiloxane oligomers are mixed together in a suitable proportion depending on the desired organopolysiloxane product. A small amount of a halogen-containing organosilane compound can be contained in the starting mixture of the organosiloxane oligomers.

The siloxane rearrangement reaction in step (a) of the inventive method is performed according to a known procedure. Namely, a mixture of the organosiloxane oligomers is admixed with 1 to 10% by weight of sulfuric acid or fuming sulfuric acid and the mixture is agitated at a temperature in the range from 20° to 70° C. or, preferably, from 30° to 50° C. for a length of time of, usually, 1 to 10 hours so that the reaction reaches equilibrium giving the desired organopolysiloxane.

The reaction mixture after step (a) of the inventive method is then admixed under agitation with a limited amount of water so as to hydrolyze the acid catalyst residue bonded to the organopolysiloxane molecules. The water can be introduced in the liquid form or as steam. The amount of water added to the reaction mixture is in the range from 10% to 1000% by weight or, preferably, from 30 to 100% by weight based on the amount of the sulfuric acid or fuming sulfuric acid used in step (a). The hydrolysis reaction can proceed in a wide range of temperature from −20° C. to +200° C. but it is preferable to conduct the hydrolysis reaction at a temperature in the range from 30° C. to 50° C. so that the hydrolysis reaction is complete, usually, within 30 minutes to 3 hours. It is of course that the hydrolysis reaction of the acid residue bonded to the organopolysiloxane molecules introduces silanolic hydroxy groups in a corresponding amount. Since the amount of water used in the hydrolysis reaction is so limited, however, the silanolic hydroxy groups as formed readily obtained from the silanol condensation reaction under the above mentioned conditions to form new siloxane linkages so that the organopolysiloxane after step (b) contains silanolic hydroxy groups only in a small and controlled amount.

In step (c) of the inventive method, the reaction mixture after the above described hydrolysis reaction in step (b) is kept standing for a while so that the mixture is separated into an aqueous phase containing sulfuric acid as the hydrolysis product in the lower layer and a phase of the organopolysiloxane in the upper layer. The acidic aqueous phase in the lower layer is taken and discarded in a conventional manner.

In step (d) of the inventive method, the organopolysiloxane freed from the acidic aqueous phase is washed with water in any sufficiently large volume until the washing is neutral so as to wash away any trace amount of the acid catalyst remaining therein. The procedure for this washing can be substantially the same as in the conventional method in which the organopolysiloxane mixture obtained in the acid-catalyzed reaction is directly washed with a large volume of water. Advantageously, however, this step of washing of the organopolysiloxane with water can be greatly simplified as compared with conventional processes since almost all amount of the acid has already been removed in the preceding steps (b) and (c). If necessary, the organopolysiloxane after washing with water is dried by a known method.

The organopolysiloxane product obtained by the above described inventive method is freed from any trace amount of the acid catalyst residue still without increasing the amount of the silanolic hydroxy groups. Removal of the acid residue from the organopolysiloxane is so complete that a satisfactory solution can be obtained for the problems of corrosiveness, unpleasant odor, breakdown of electric insulation and the like unavoidable when an organopolysiloxane prepared by the conventional method is used in the respective applications.

In the following, the method of the present invention is described in more detail by way of examples, in which the term of "parts" always refers to "parts by weight" and the values of viscosity are all those obtained by the measurement at 25° C.

Example 1.

A mixture composed of 100 parts of octamethyl cyclotetrasiloxane, 10 parts of hexamethyl disiloxane and 5 parts of concentrated sulfuric acid was agitated in a reaction vessel for 5 hours at a temperature of 30° to 50° C. to effect the siloxane rearrangement reaction until polymerization had proceeded to establish equilibrium. Thereafter, the reaction mixture was admixed with 3 parts of water and agitated for 2 hours at 30 to 50° C.

The mixture was kept standing to be separated into phases, of which the aqueous phase in the lower layer was taken and discarded. The organopolysiloxane in the upper layer was washed with water until the washing was neutral and then dried over anhydrous sodium sulfate.

The dimethyl silicone fluid obtained in this manner was colorless and clear and had a viscosity of 16.75 centistokes. The results of the chemical analysis thereof were that the content of sulfur was 0.2 ppm by weight or less and the content of silanolic hydroxy groups was 50 ppm by weight.

For comparison, another silicone fluid was prepared in the same formulation as above except that the reaction mixture after the siloxane rearrangement reaction was directly washed with water to neutrality. The thus obtained silicone fluid had a viscosity of 16.58 centistokes and contained 0.3 ppm and 550 ppm by weight of sulfur and silanolic hydroxy groups, respectively.

Example 2.

The experimental procedure was substantially the same as in Example 1 except that, in place of 3 parts of liquid water, 3 parts of steam under a pressure of 2 $kg/cm^2$ (absolute) were introduced into a pressurizable vessel containing the reaction mixture which was agitated therein for 2 hours at 30° to 50° C. The thus obtained silicone fluid had a viscosity of 16.34 centistokes and contained 0.2 ppm or less and 95 ppm by weight of sulfur and silanolic hydroxy groups, respectively.

What is claimed is:

1. A method for the preparation of an organopolysiloxane free from residue of acid catalyst, which method comprises the successive steps of:
   (a) subjecting a mixture of organosiloxane oligomers to a siloxane rearrangement reaction in the presence of sulfuric acid or fuming sulfuric acid as a catalyst to effect polymerization of the organosiloxanes to equilibrium to give an organopolysiloxane containing residue of the acid;
   (b) admixing and agitating the acid residue-containing organopolysiloxane with water to affect hydrolysis of the acid residue bonded to the organopolysiloxane molecules;
   (c) subjecting the water-admixed organopolysiloxane to phase separation into an aqueous phase and a phase of the organopolysiloxane to discard the aqueous phase; and (d) washing the organopolysiloxane freed from the aqueous phase with water;

wherein the amount of water admixed in step (b) is in the range from 30% to 100% by weight based on the amount of acid catalyst used in step (a).

2. The method for the preparation of an organopolysiloxane as claimed in claim 1 in which the hydrolysis in step (b) is performed at a temperature in the range from 30° to 50° C. for a length of time in the range from 30 minutes to 3 hours.

* * * * *